United States Patent
de la Chevrotiere et al.

(10) Patent No.: US 12,211,371 B2
(45) Date of Patent: Jan. 28, 2025

(54) SYSTEMS AND METHODS FOR REAL-TIME PRIORITIZATION AND MANAGEMENT OF HEAT TRACE CIRCUIT ALARMS

(71) Applicant: Electrical Heat Trace Group Ltd., Kitchener (CA)

(72) Inventors: Eric de la Chevrotiere, Ayr (CA); Cian Howitt, Waterloo (CA)

(73) Assignee: Electrical Heat Trace Group Ltd., Kitchener (CA)

( * ) Notice: Subject to any disclaimer, the term of this patent is extended or adjusted under 35 U.S.C. 154(b) by 134 days.

(21) Appl. No.: 18/179,741

(22) Filed: Mar. 7, 2023

(65) Prior Publication Data

US 2023/0282098 A1 Sep. 7, 2023

Related U.S. Application Data

(60) Provisional application No. 63/317,246, filed on Mar. 7, 2022.

(51) Int. Cl.
*G08B 29/04* (2006.01)
*G08B 21/18* (2006.01)
*G08B 29/24* (2006.01)

(52) U.S. Cl.
CPC ........... *G08B 29/24* (2013.01); *G08B 21/185* (2013.01); *G08B 29/04* (2013.01)

(58) Field of Classification Search
CPC ...... G08B 29/24; G08B 21/185; G08B 29/04; F16L 53/38; F16L 53/37; F16L 53/35; H05B 1/0244
See application file for complete search history.

(56) References Cited

U.S. PATENT DOCUMENTS

| | | | | |
|---|---|---|---|---|
| 4,539,562 A | * | 9/1985 | Sanders | G01R 19/12 340/657 |
| 4,701,598 A | * | 10/1987 | Cooper | H05B 3/56 219/535 |
| 5,723,848 A | * | 3/1998 | Bilenko | H05B 1/0244 219/486 |
| 5,933,574 A | * | 8/1999 | Avansino | F16L 53/38 219/535 |
| 6,735,496 B1 | | 5/2004 | Roman | |
| 8,000,814 B2 | | 8/2011 | Havekost et al. | |

(Continued)

*Primary Examiner* — Andrew W Bee
(74) *Attorney, Agent, or Firm* — Own Innovation; James W. Hinton

(57) ABSTRACT

Systems and methods for real-time prioritization and management of heat trace circuit alarms are provided. A method includes importing heat trace circuit alarm data, ERP scheduling data, process data, operations data and weather data to establish a criticality matrix for prioritizing heat trace alarms. Alarms are assigned a criticality rating and alarm grouping based on the criticality matrix. Alarms are prioritized according to the criticality rating and an independent self-test to validate each alarm is performed based on the alarm grouping. Validated alarms are compared against ERP data to create or update a work request to repair to alarm based on the criticality rating. The system may implement artificial intelligence machine learning algorithms to predict failure of heat trace circuit components based on alarm history and tracked electrical and temperature operating parameters of heat trace circuits.

19 Claims, 6 Drawing Sheets

(56) References Cited

U.S. PATENT DOCUMENTS

| | | |
|---|---|---|
| 10,127,799 B2 | 11/2018 | Janchookiat |
| 2007/0288100 A1 | 12/2007 | Campbell |
| 2011/0163082 A1* | 7/2011 | Mullen .............. G05B 23/0272 |
| | | 219/494 |
| 2017/0248978 A1 | 8/2017 | Mullen |
| 2018/0279450 A1* | 9/2018 | Heiligenstein ......... H05B 45/38 |
| 2022/0400536 A1* | 12/2022 | Allenspach ............... F17D 1/05 |

* cited by examiner

| Rule 520 | Commodity 502 | Line Size 504 | Non-Functioning 506 | Alarm 508 | Process Temp. 510 | Ambient Temp. 512 | Alarm Group 514 | Criticality Rating 516 |
|---|---|---|---|---|---|---|---|---|
| 1 | Any | Any | Any | Reset | Any | Any | Default | 0 |
| 2 | K | Any | Any | Low Temp. | Any | ≤ 5* | Critical low temp. | 3 |
| 3 | K | Any | Any | Low Temp. | ≤ 15* | Any | Critical low temp. | 3 |
| 4 | PE | ≤ 6* | Any | Low Temp. | ≤ 25* | Any | Critical low temp. | 2 |
| 5 | PE | > 6 | Non-Functioning | Any | Any | ≤ 5* | Default | 2 |
| 6 | PE | ≤ 6* | Non-Functioning | Any | Any | ≤ 5 | Default | 3 |
| 7 | PE | ≤ 6 | Non-Functioning | Low Temp. | Any | > 5 | Default | 1 |
| 8 | HPS | Any | Non-Functioning | Any | Any | ≤ 5* | Default | 3 |
| 9 | HPS | Any | Non-Functioning | Any | Any | > 5 | Default | 3 |
| 10 | HPS | Any | Non-Functioning | Any | Any | ≤ 5* | Default | 1 |
| 11 | Any | Any | Non-Functioning | Any | ≤ 5* | Any | Default | 3 |
| 12 | Any | Any | Any | Low Temp. | Any | Any | Default | 1 |
| 13 | Any | Any | Any | Low Temp. | ≤ 5* | Any | Critical low temp. | 1 |
| 14 | Any | Any | Any | Low Temp. | > 5 | Any | Non-Critical low temp. | 0 |

* or value N/A

FIG. 5

SYSTEMS AND METHODS FOR REAL-TIME PRIORITIZATION AND MANAGEMENT OF HEAT TRACE CIRCUIT ALARMS

TECHNICAL FIELD

The embodiments disclosed herein relate to heat trace circuits, and, in particular to systems and methods for real time prioritization and management of heat trace circuit alarms.

INTRODUCTION

Heat tracing is used to maintain or raise the temperature of pipes or vessels and the contents therein. Heat tracing is employed, for example, to prevent condensation on pipes, to prevent pipes from freezing in low temperatures and to maintain the temperature, pressure or viscosity of a fluid flowing within a pipe. Such applications are common in commercial and industrial processes such as water treatment, petroleum refinement, etc. where process fluids must be maintained at a specific temperature or within a temperature range.

A typical heat trace circuit includes an electrical heating element in contact with a length of pipe, a heat trace controller for regulating the power to the heating element, and a power source. Heat trace circuits may include built-in mechanisms for monitoring the operational status of the heat trace circuit. For example, a heat trace controller may include a ground fault alarm that is triggered when a ground fault in the circuit is detected. Other alarms may be configured for detecting: when the temperature of a pipe is above/below a threshold, when the current in the circuit is above/below a threshold; when the ground fault current is above a threshold but not tripped; temperature sensor failure; when a circuit is forced on; loss of communication to a controller or group of controllers, etc. A heat trace circuit may further be connected to a monitoring device (e.g., a computer, server, etc.) for monitoring the operational status of the heat trace circuit and alarms.

A single facility may employ hundreds to tens of thousands of individual heat trace circuits on various machinery, equipment and piping. Software may be used to monitor and manage the heat trace circuits from a central location over a communications network. Existing software for heat trace circuit monitoring may record the operational status and alarms of each heat trace circuit. The software may be configured to generate an alarm in response to a sensor reading; silence an alarm; reset an alarm, etc.

A limitation of existing heat trace management software is that the software may be specific to the heat trace circuit, or the components therein, thus limiting wide applicability. A further limitation is that the software for heat trace circuit management is typically stand-alone and cannot be integrated with existing Enterprise Resource Planning (ERP) systems for scheduling maintenance or repairs on heat trace circuits, which may result in duplication of work. Yet another limitation is that manual entry is often used for entering data into the heat trace management system, scheduling work tickets, resolving alarms, etc. which results in bottlenecks in heat trace circuit management and maintenance/repair. The above problems are amplified with the more heat trace circuits a facility has.

Accordingly, there is a need for new systems and methods for heat trace circuit management to address the above-described limitations.

SUMMARY

Systems and methods for real-time prioritization and management of heat trace circuit alarms are provided.

According an embodiment, there is system for managing and prioritizing heat trace circuit alarms. The system comprises at least one heat trace circuit installed at a facility. The heat trace circuit includes a controller for regulating power to a heating element, wherein the controller has a plurality of configurable settings to control operation of the heat trace circuit.

The heat trace circuit includes a sensor for measuring an operating parameter of the heat trace circuit to providing an input to the controller to adjust power to the heat trace circuit. The sensor may be a temperature or a current sensor.

The heat trace circuit includes an alarm, wherein the alarm is triggered when the operating parameter varies from a configurable setting. The alarm may be triggered by, for example, current in the heat trace circuit below a low current threshold; current in the heat trace circuit above a high current threshold; temperature of the heating element below a low temperature threshold; temperature of the heating element above a high temperature threshold; the heat trace circuit is forced on; a ground fault in the heat trace circuit; or the connection between the controller and the management device is lost.

The system further comprises a management device connected to the controller. The management device may be directly connected to the controller or connected over a communications network or via a supervisory device. The management device is configured to store the configurable settings, sensor data and alarm data received from the controller, adjust the configurable settings and run a self-test procedure on each heat trace circuit, independent of the controller.

According to an embodiment, there is a method for managing and prioritizing heat trace circuit alarms. The method comprises plotting preset alarm criticality rules and preset process criticality rules to establish a criticality matrix. The method further comprises importing heat trace alarm data and configurable settings from a plurality of heat trace circuits. The method further comprises assigning a criticality rating to each heat trace circuit alarm, according to the criticality matrix. The method further comprises determining a self-test procedure for the alarm based on the new criticality rating and automatically running the self-test procedure on every heat trace circuit having the new criticality rating, wherein the self-test procedure is run independent to a controller in the heat trace circuit.

The method may include excluding the alarm if a current alarm status indicates the heat trace circuit is forced on or electrically locked out. The method may further include connecting to an ERP system to identify if an existing work ticket exists for the heat trace circuit and updating the work ticket to reflect the current alarm status and criticality rating.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 5 is an exemplary criticality matrix, according to an embodiment; and

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, server, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1:
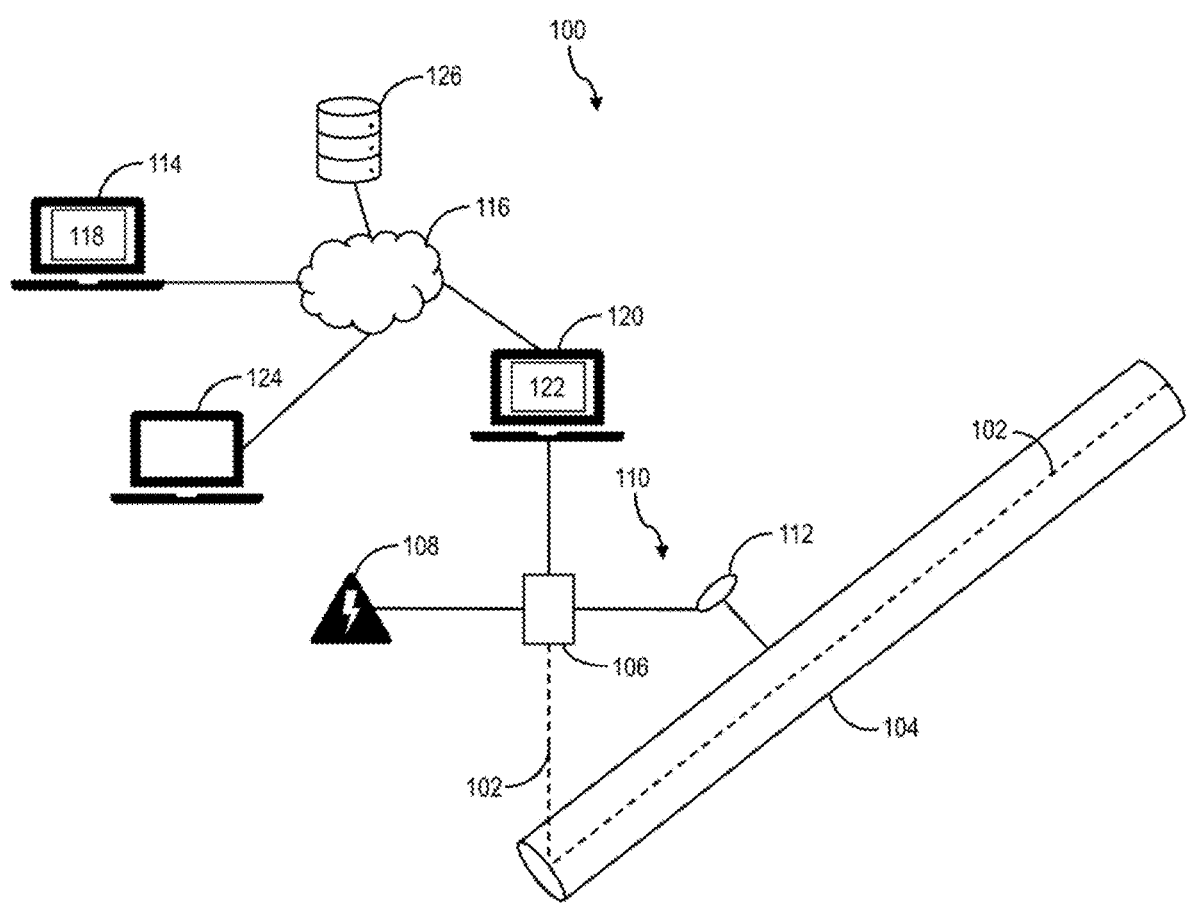
FIG. 1 is a diagram of a heat trace circuit management system, according to an embodiment.

Referring to FIG. 1, shown therein is a heat trace circuit management system 100. The system 100 includes a heat trace circuit 110. The heat trace circuit 110 comprises an electrical heating element 102 (dashed line) in contact with a length of pipe 104. The electrical heating element 102 may be provided as a cable or wire. The electrical heating element 102 may be in contact with an outer or inner surface of the pipe 104. The pipe 104 may be a process pipe, or the like, for transporting a fluid. The pipe 104 is thermally insulated to retain heat loss. Heat generated by the heating element 102 conductively passes to the pipe 104 and the contents therein.

The heat trace circuit 110 includes a heat trace controller 106. The heat trace controller 106 controls operation of the heat trace circuit 110 by regulating power to the heating element 102 from a power source 108. The power source 108 is typically an electrical panel board. The heat trace controller 106 may have configurable settings to control operation of the heat trace circuit 110. The configurable settings may be specific the heat trace controller 106, the heat trace circuit 110 or the facility where the heat trace circuit 110 is installed.

The heat trace circuit 110 include one or more sensors 112 to provide input to the heat trace controller 106 to adjust the power to the circuit 110. According to various embodiments, the sensors 112 may be a temperature sensor (e.g., a resistance temperature detector), a pressure sensor, or other sensor, based on the contents of the pipe 104 and environment where the heat trace circuit 110 is installed. A temperature sensor 112 may measure any one of: the ambient temperature, the temperature of the contents of the pipe 104 and the temperature of an external surface of the pipe 104.

The system 100 may include a supervisory terminal 120. The supervisory terminal 120 may be a computer, server, or the like, connected to the heat trace controller 106. The supervisory terminal 120 may implement a Modbus communication protocol to exchange data with the heat trace controller 106 over a serial connection. According to other embodiments, the system 100 may include a plurality of heat trace circuits 110, each connected to the supervisory terminal 120. The supervisory terminal 120 is typically located on-site at the facility where the heat trace circuit 110 is installed.

The supervisory terminal 120 is installed with heat trace supervisory software 122 for recording and displaying data received from the heat trace controller 106, for example, operational status data, sensor data and alarm data of the heat trace circuit 110. The supervisory software 122 may be used to send commands to the heat trace controller 106 and adjust configurable settings of the heat trace controller 106. For example, the supervisory software 122 may be used to reset an alarm that is triggered or adjust a temperature threshold value.

The system 100 includes a management device 114. The management device 114 may be a computer, a server, a smartphone, a tablet device, or the like. The management device 114 may be directly connected to the heat trace controller 106, or may be connected via a communications network 116, or may be connected via the supervisory terminal 120 (as shown). When directly connected, the management device 114 may implement a Modbus communication protocol to exchange data with the heat trace controller 106 over a serial connection. According to other embodiments, the system 100 may include a plurality of heat trace circuits 110, each connected to the management device 114. The management device 114 may be located on-site where the heat trace circuit 110 is installed or may be located off-site.

The management device 114 is installed with a heat trace management application 118. According to some embodiments, the application 118 may be a web-based or cloud-based application accessible via a web browser installed on the management device 114. The management application 118 may be used for recording and displaying data received from the heat trace controller 106, for example, operational status data, sensor data and alarm data of the heat trace circuit 110. The management application 118 may be used to send commands to the heat trace controller 106 to adjust configurable settings of the heat trace controller 106. For example, the management application 118 may be used to reset an alarm that is triggered or adjust a temperature threshold value. The management application 118 may interface with the supervisory software 122 through an API connection, or other means, to import operational status data, sensor data and alarm data of the heat trace circuit, send commands and adjust configurable settings of the heat trace controller 106.

According to embodiments wherein the system 100 includes a plurality of individual heat trace circuits 110 installed at one or more facilities, the management software 118 may be configured to automatically aggrege, process and display the global data received from the plurality of heat trace circuits 110, the data specific to the heat trace circuits 110 at a facility, as well as the data specific to each individual heat trace circuit 110 at a facility.

According to an embodiment, the management application 118 may be configured to integrate work ticket data from an external ERP system 124 with heat trace data to perform real-time scheduling for maintenance/repairs to heat trace circuits that have triggered alarms. For example, the management application 118 may implement a process to cross-reference heat trace alarms of a particular status with existing in-progress field assessment work tickets and newly submitted work tickets from the ERP system to ensure field assessments are not duplicated.

According to an embodiment, the management application 118 may be configured to automatically validate heat trace alarms by comparing monitoring fields in the heat trace controller 106 to alarm parameters independent to the controller's processor and the alarm status of the controller 106. Monitoring fields are generally any configurable setting of the heat trace circuit 110, for example, current, ground fault current and temperature. The management application 118 may then automatically energize the heat trace circuit 110 to validate the alarm.

According to an embodiment, the management application 118 may be configured to automatically perform heat trace controller configuration audits to check for configurable settings of a heat trace circuit that are out of range. The controller configuration audit includes: extracting heat trace controller setting configurations; identifying settings that are out of range based on a predetermined rule set; and flagging any variances for user review. A predetermined rule set may be established according to industry best practices and designated setpoint schedules for the specific heat trace components used. In some cases, a designated setpoint schedule may not exist for the heat trace controller, or may not include the full settings configuration of the controller. Accordingly, the predetermined rule set may be a combination of industry best practices and a designated setpoint schedule.

According to an embodiment, the management application 118 may be configured to automatically ensure heat trace circuits 110 have not been disabled or removed from the supervisory software 122 by extracting controllers from a supervisory software 122 database and comparing to a system database 126 and flagging any variances for user review. Variances may result from the addition or removal or disabling of heat trace controllers 106 in the supervisory software 122. Variances may result from adjustments to heat trace controller 106 settings in the supervisory software 122. A baseline for each heat trace circuit 110 "design parameters" may be set using the management application 118 and stored in the system database 126 for comparison to the supervisory software 122 database.

According to various embodiments, the management application 118 may be further configured to implement artificial intelligence (AI) and/or machine learning (ML) algorithms to: a) predict or optimize scheduling for maintenance/repairs by associating an alarm with its failure point to estimate repair times for scheduling purposes; b) predict heat trace cable degradation based on inadequate power output by a heat trace circuit; c) predict heat trace circuit/controller component failure based on alarm history to determine when a component should be replaced prior to failure; and d) implement machine learning to analyze weather forecasts and patterns to adjust alarm prioritization and criticality. The AI and ML algorithms may comprise multiple linear regression models to track the actual electrical and temperature properties (e.g., current at a particular temperature) in a heat trace circuit over time to predict an approximate time of heat trace circuit/component failure.

The management application 118 may implement AI/ML to: extract scheduled work hours and executed work hours from an external ERP system to predict future maintenance schedules or display an analysis of work time to budget saved and spent; capture environmental temperature data, current alarm data and scheduled work history to generate or optimize future maintenance schedules and predict potential failure of heat trace circuit components; analyze current and historic alarm and repair history to predict future maintenance schedules and potential failure of heat trace circuit components.

Methods and processes implemented using the management software 118 are described in more detail below.

Figure 2:
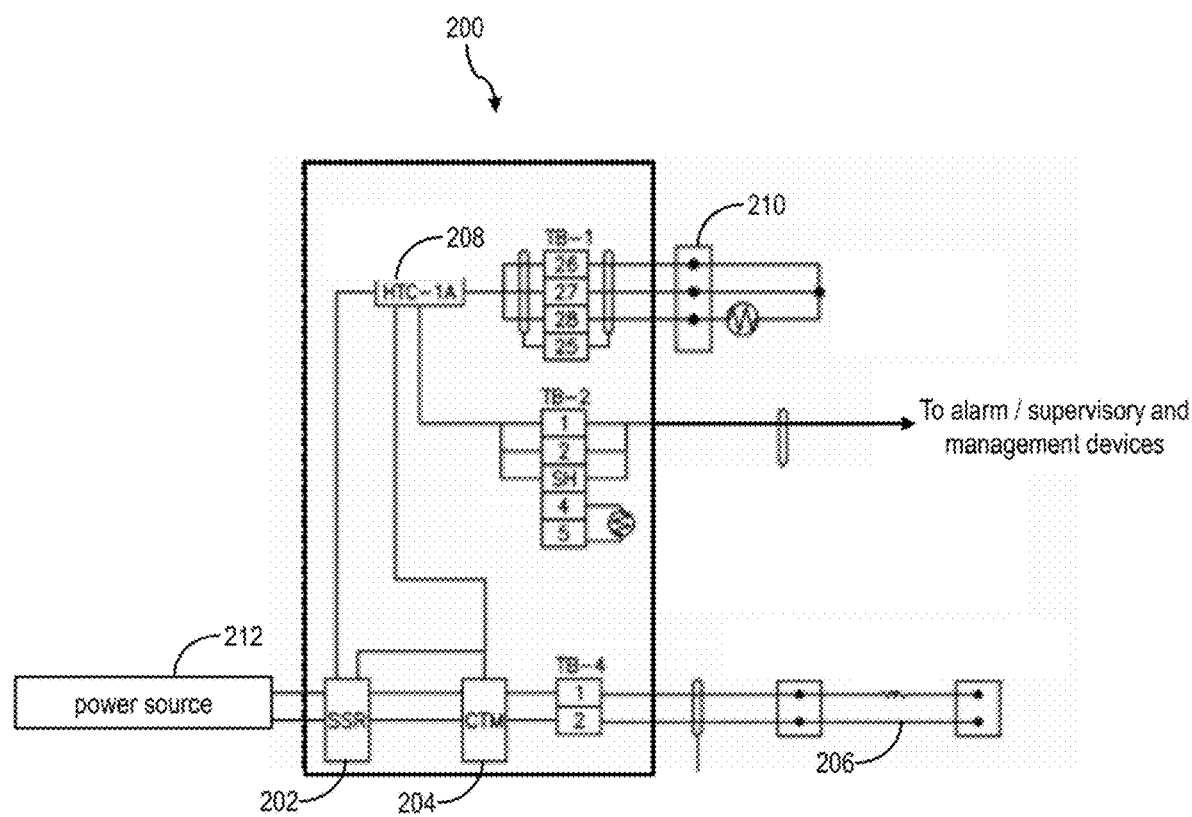
FIG. 2 is a diagram of a heat trace controller, according to an embodiment.

Referring to FIG. 2, shown therein is a diagram of a heat trace controller 200, according to an embodiment. The heat trace controller 200 may be the controller 106 shown in FIG. 1. The heat trace controller 200 may control the operation of a single heat trace circuit (as shown in FIG. 1) or may control the operation of a plurality of heat trace circuits connected to the controller.

The heat trace controller 200 includes an electromechanical or solid-state relay 202 to open or close the path of current from a power source 212 to the electrical device 206. The heat trace controller 200 includes a current transformer 204 for measuring the current supplied into an electrical heating element (or cable) 206 to detect ground faults.

The heat trace controller 200 has configurable settings to control operation of the heat trace circuit and response to alarms. For example, the heat trace controller 200 may have configurable settings for a low current alarm, a ground fault condition, a low temperature alarm, etc. Generally, the heat trace controller 200 may have 30-40 configurable settings.

The heat trace controller 200 includes a process controller 208 (i.e., a computer processor). The process controller 208 is configured to operate the heat trace controller 200 (and by extension the heat trace circuit the controller 200 commands) according to the configurable settings of the controller 208. The process controller 208 is further configured to regulate the flow of current into the heating element 206. The process controller 208 may be further configured to receive and process input received from one or more connected sensors, for example, an ambient temperature sensor 210. Based on the data received from the sensor 210, the process controller 208 may automatically adjust the flow of current into the heat trace cable (heating element 206).

The process controller 208 may be configured to trigger an alarm if, for example, a ground fault is detected by the current transformer 204 or if the ambient temperature data from the temperature sensor 210 indicates a drop below a threshold temperature. The process controller 208 may be further configured to transmit operational status data of the heat trace circuit and sensor data received from the sensor 210 to a supervisory terminal and/or a management device for storage, processing and/or display.

Figure 3:
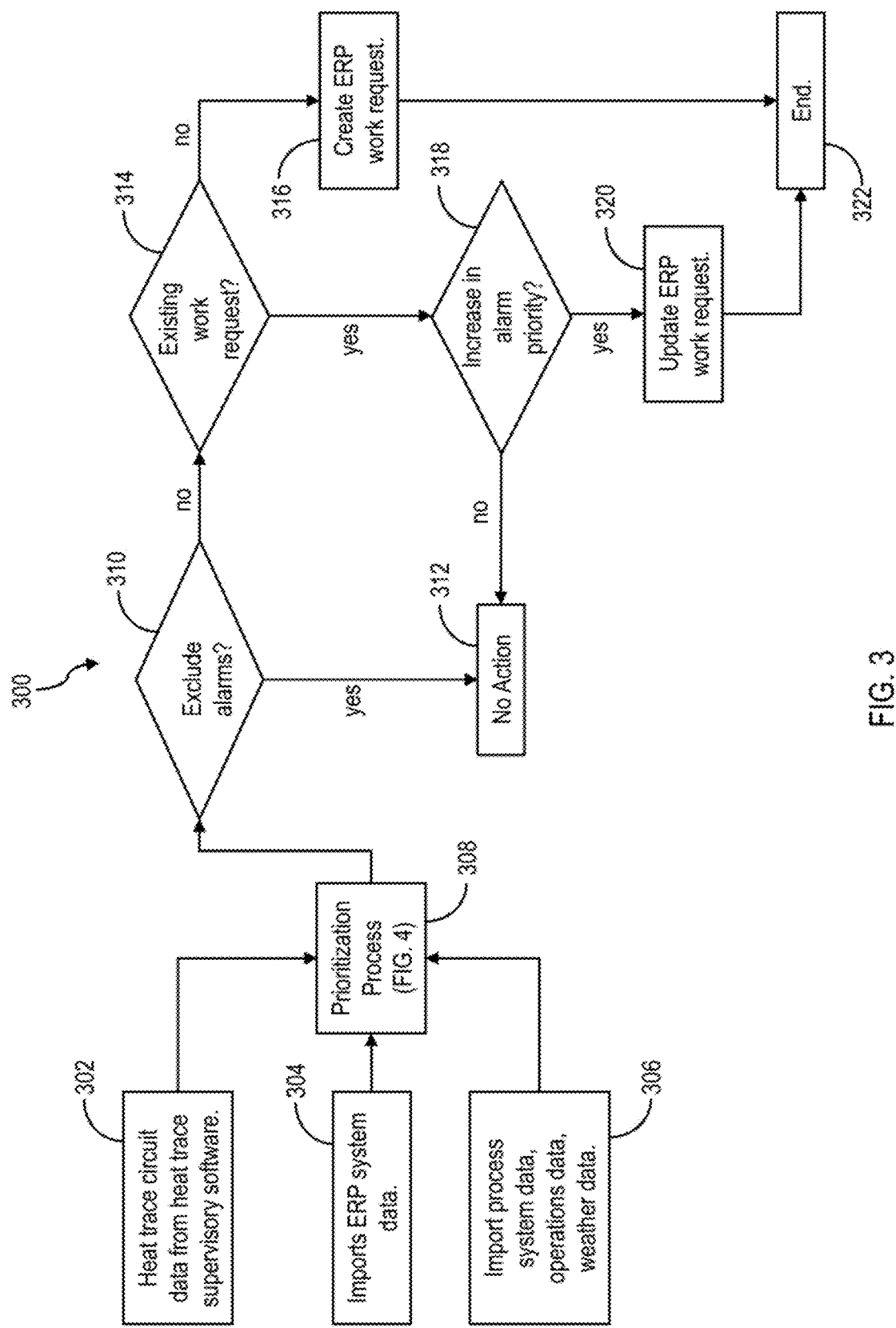
FIG. 3 is flowchart of an alarm management method, according to an embodiment.

Referring to FIG. 3, shown there is a flowchart of an alarm management method 300, according to an embodiment. The method may be implemented by the application 118 on the management device 114 shown in FIG. 1.

At 302, heat trace circuit data is imported from heat trace supervisory software into heat trace management software. The heat trace circuit data comprises: an identifier tag for each heat trace circuit; alarm data of each heat trace circuit including type of alarm, when it was triggered and a current alarm status; and configuration settings of the heat trace controller, for example, a low current threshold, a low temperature threshold, etc.

At 304, work lists and/or scheduling data is imported from an ERP data system. The scheduling data includes open/closed work tickets (including engineering work, maintenance work, construction work, etc.), pre-scheduled maintenance events and other facility specific information including time entry, tagging, etc. The scheduling data may further include the spent work time for a work ticket or maintenance event.

At 306, process data, operations data and weather data are imported. The process data is data specific to the facility where the heat trace circuits are installed. Process data includes, what process equipment heat trace circuits are installed (e.g., 2-inch condensate line containing fluid parameters of X). Operations data includes, for example, data specific to the facility where the heat trace circuit is installed (e.g., petroleum refinery X, address, etc.). Weather data includes local weather both current, historical, and forecast.

Data imported at Acts 302, 304 and 306 may stored in a database or cloud database accessible by the management software. The imported data may be synchronized with previously imported data. For example, a previous alarm status may be synchronized to a current alarm status. Preferably, the data importation at Acts 302, 304, 306 is performed automatically in real-time through APIs connected to relevant the software or system. Acts 302, 304, 306 may be performed simultaneously. The data imported at Acts 302, 403 and 306 may be used to modify predetermined rule sets as described below.

Figure 4:
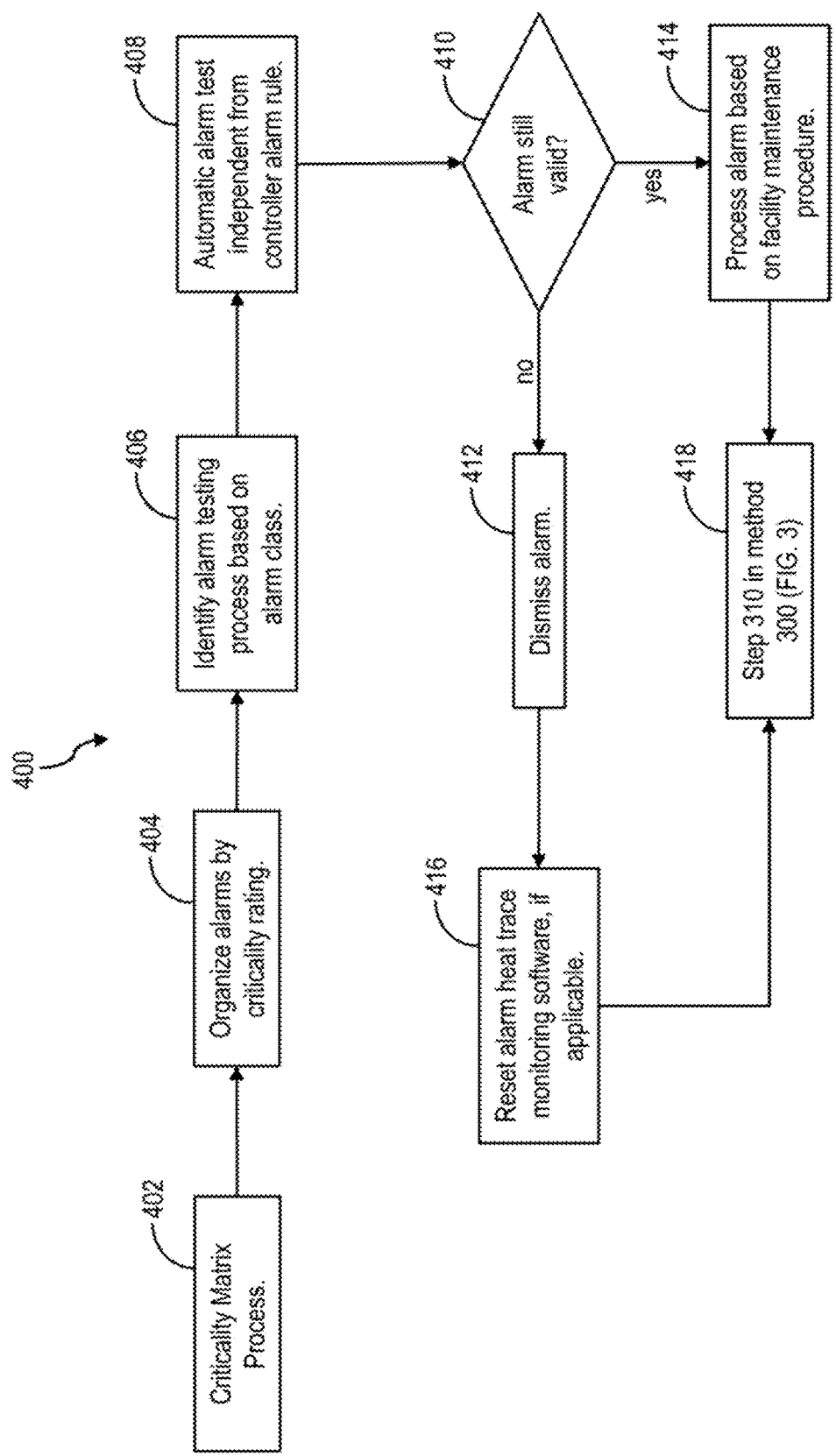
FIG. 4 is a flowchart of an alarm prioritization method, according to an embodiment.

At 308, the imported data is processed by an alarm prioritization method (FIG. 4).

At 310, following the alarm prioritization process, it is determined whether to exclude any alarms. Alarms may be excluded if the alarm is triggered by electrical lock out, or a forced-on request.

Electrical lock out refers to a situation where existing work is being performed on the heat trace circuit associated to the alarm. In such a situation, power to the heat trace circuit may be shut off to perform the work. The loss of power to the circuit triggers an alarm by default, however the alarm is not the result of a defect or fault in the heat trace circuit itself. Thus, when a heat trace circuit is electrically locked out, a lock out tag associated to the circuit is stored in a list and compared with the identifier tag of the circuit the alarm is associated.

Forced-on request refers to a situation where a facility will override the automatic control of a heat trace circuit and the circuit is forced on to bypass any configurable settings to always be on. The always on operation of the heat trace circuit may thus trigger alarms when the always on state of the circuit falls outside of the configurable settings range. Typically, alarms triggered as a result of forcing on the heat trace circuit are filtered out/excluded. In some cases, an alarm triggered in a forced-on heat trace circuit will be recorded for alarm visibility and energy consumption tracking purposes. To determine whether an alarm in a forced-on circuit is a valid alarm, rather than an alarm caused by forcing on, some controllers will have a specific register that is readable (e.g., "control state=always on") to assess when/how an alarm is triggered.

At 312, if an alarm is excluded, no action is taken.

At 314, it is determined whether there is an existing work request for the alarm in the ERP system that is currently in progress. The identifier tag for the alarm may be cross referenced with the work tickets in the ERP system to determine whether a work ticket has been opened for the alarm and whether any work is in progress.

At 316, if there is no work request for the alarm, a new work request for the alarm is submitted to the ERP system to open a new work ticket for the alarm.

At 318, if an existing work request for the alarm exists in the ERP system, then it is determined whether the alarm criticality has increased in priority since the work request was submitted. If the priority is the same or has decreased, no action is taken.

At 320, if the alarm criticality priority has increased, the existing work request in the ERP system is updated to reflect the increase in priority to initiate field troubleshooting for further assessment or repair.

Following Act 316, or Act 320, as the case may be, the method 300 concludes at 322.

The method 300 may be advantageous for processing a large number of alarms from a plurality of heat trace circuits in real-time, to avoid confusion and duplication of work. Furthermore, the method 300 may be implemented to coordinate work to be performed across a plurality of facilities according to alarm prioritization which is updated in real-time.

Referring to FIG. 4, shown there is a flowchart of an alarm prioritization method 400, according to an embodiment. The method may be implemented by the application 118 on the management device 114 shown in FIG. 1.

At 402, a criticality matrix is established. The criticality matrix is a facility-specific customized rule set for rating the importance of an alarm and prioritizing alarms for repair/maintenance. The criticality matrix plots alarm criticality rules and process criticality rules. An alarm criticality rule may be, for example, a non-operation alarm for a heat trace circuit is a high priority, whereas a low-operation alarm is a low priority. A process criticality rules are generally facility specific and relate to the criticality of equipment to the overall process the facility performs. A process criticality rule may be, for example, process pipe A transporting fluid X has a high priority when the ambient temperature is Z whereas process pipe B transporting fluid Y has a low priority.

The criticality matrix is created based on predetermined default rule sets for alarm and process criticality, as modified by the data imported at Acts 302-306 in method 300. For example, a predetermined default process criticality rule may be modified or weighted according to the process data received at Act 306. The criticality matrix may be approved by a facility prior to implementation.

The criticality matrix may be refined in successive implementations of the method 400 based on how well the prioritization of alarms works at Act 404.

At 404, each alarming circuit is assigned a criticality rating based on the rules stipulated in the criticality matrix. The criticality rating may refer to a class (e.g., high priority, low priority, ignore) and/or a specific criticality value. Alarms are prioritized according to the criticality rating from highest priority to ignore.

At 406, an alarm testing process is identified for each alarm based on the criticality rating class for that alarm. For example, alarms rated as high priority, may be subject a first testing processing, whereas alarms rated as low priority may be subject to a second testing process. Alarms rated as ignore will not be tested.

At 408, the testing process identified for an alarm criticality class is automatically run on all respective alarms within that alarm criticality class. Advantageously, the tests are run independent to the heat trace controller alarm status, rather than simply assuming the alarm is valid and there is a fault in the associated heat trace controller or heat trace circuit.

A self-test of the heat trace circuit is initiated when the alarm pertains to whether the circuit is energized or not. The parameters of the heat trace circuit and configurable settings of the heat trace controller are assessed to determine if alarm conditions are actually met. For example, a low or high current alarm will trigger a self-test to energize the circuit for a short period of time to confirm if the circuit will energize and draw current. A low or high temperature alarm will trigger an independent comparison of the circuit temperature setpoint value to a low temperature/high temperature alarm setting. A temperature sensor failure alarm will trigger an assessment of whether the temperature reading is within a valid temperature range.

At 410, it is assessed whether the alarm is still valid following the automatic independent test. If the alarm is deemed not to be valid, it is dismissed at 412. If the alarm is deemed to be valid, the alarm is processed based on facility maintenance procedures 414.

At 416, the alarm is reset. If applicable, the alarm monitoring software (in the supervisory terminal) may also be reset. Following Act 416, or Act 414, as the case may be, the method 400 concludes at 418 wherein step 310 in method 300 is performed.

Referring to FIG. 5, shown therein is an exemplary criticality matrix 500, according to an embodiment. The criticality matrix 500 includes preset alarm criticality rules 520 for assigning a criticality rating 516 based on process and alarm parameters 502, 504, 506, 508, 510, 512, 514.

The commodity 502 is the material or substance contained within a pipe, or vessel (hereafter, the "line") heated by a heat trace circuit. The line size 504 is the diameter or volume of the line or vessel being heated by the heat trace circuit. Non-functioning 506 refers to whether the heat trace circuit is operating or not. Alarm 508 indicates the type of alarm that is triggered in the heat trace circuit for the line. Process temp 510 is the normal process temperature of the line. Ambient temp 512 is the measured ambient temperature for the line. Alarm group 514 is the description of the group into which an alarm type 508 is grouped for independent alarm self-testing purposes.

Figure 6:
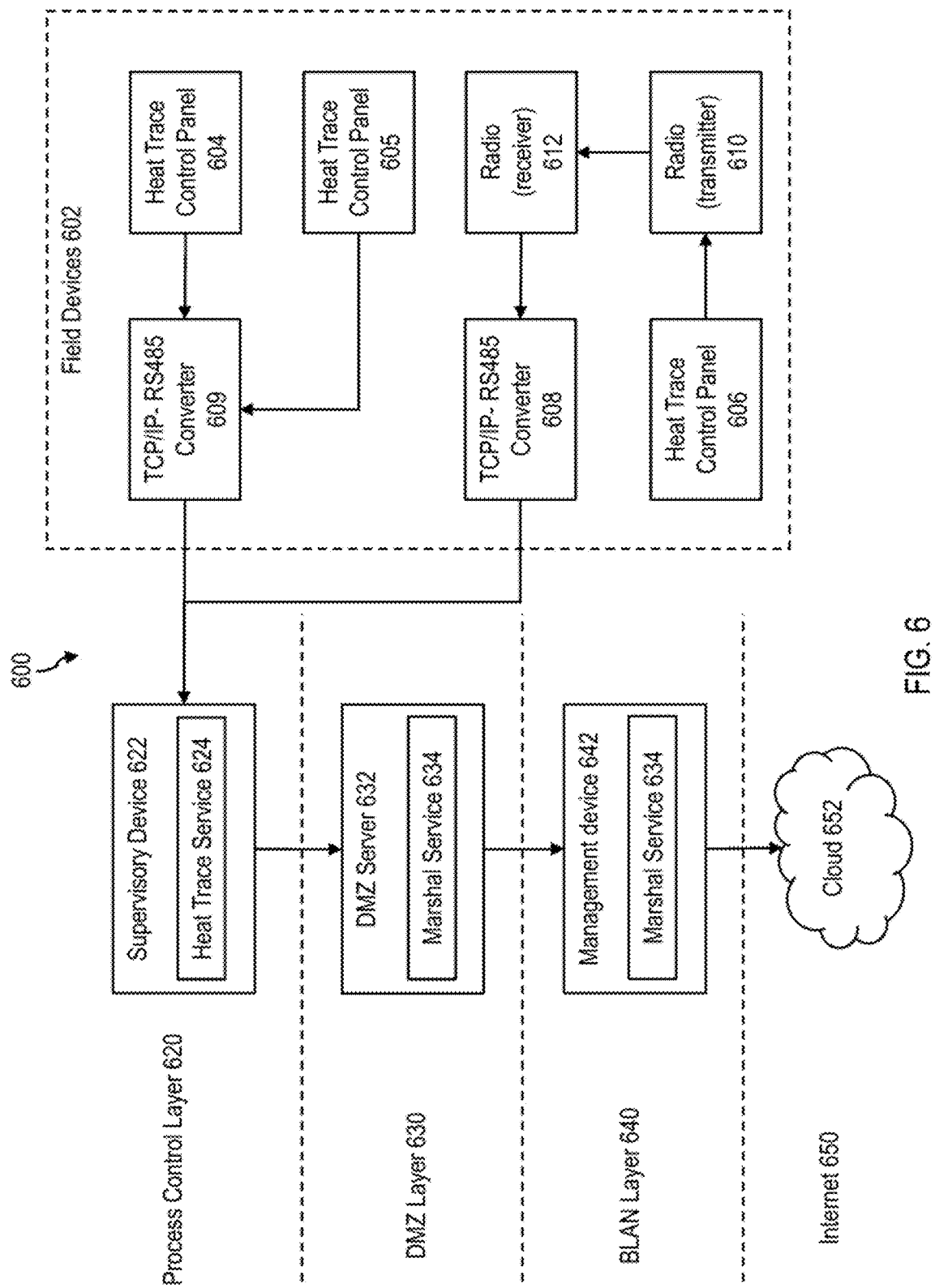
FIG. 6 is a diagram of a process control network, according to an embodiment.

Referring to FIG. 6, shown therein is a diagram of a process control network, 600, according to an embodiment. The process control network 600 may be implemented at a site using heat trace circuits. The field devices 602 comprise a plurality of heat trace controllers/devices 604, 605, 606 (e.g., heat trace control panel 200 in FIG. 2). Each heat trace controller 604, 605, 606 controls one or more heat trace circuits.

As noted above, the heat trace controllers 604, 605, 606 will typically implement a Modbus communication protocol over a serial connection. Each heat trace controller 604, 605, 606 is connected to an TCP/IP-RS485 converter 608, 609 either by a wired or wireless connection. Where the connection between the heat trace control panel 606 and converter 608 is wireless, data may be transmitted wirelessly between a radio transmitter 610 connected to the heat trace control panel 606 to a radio receiver 612 connected to the converter 608.

Typically, a network administrator will not allow access to the internet 650 on a process control layer 620 for security purposes. The reason for this, is that the process control layer 614 controls major mechanical and chemical processes and if a malicious user was to gain access to the process control layer 614, they would be able to control the devices 604, 605, 606 potentially causing catastrophic results. This makes it difficult to collect data from the devices 604, 605, 606, since a typical monitoring application can collect the data but does not have a means to securely transmit the data to a cloud 652 where the data can be analyzed.

The process control network 600 includes a process control layer 620 which has connectivity to process control devices 604, 605, 606, but has no internet connectivity to ensure there is no outside communication. A supervisory device 622 (e.g., supervisory terminal 120) is connected to the control devices 604, 605, 606 to collect heat trace circuit data. The supervisory device 622 runs a heat trace service 624 (e.g., supervisory software 122) configured to record heat trace data received from the control devices 604, 605, 606.

The process control network 600 includes a demilitarized zone (DMZ) layer 630. The DMZ layer 630 provides a perimeter network that protects and adds a layer of security to an organization's internal business local area network (BLAN) layer 640. The DMZ layer has no internet connectivity. The BLAN layer 640 includes user devices (e.g., management device 642, employee computers, etc.) that have connectivity to the internet 650.

To enable secure communications between the process control layer 620 and the cloud 652, a marshal service 624 is utilized. The marshal service 624 may be included in the management software 118. The marshal service 624 is a proxy between the DMZ layer 630 and the BLAN layer 640 that is configured to only allow egress traffic on a specific port. Since only egress traffic is allowed, the marshal service 634 does not actively listen for new connections. All communication requests for egress traffic are initiated from the heat trace service 624. In this way, all communication to the cloud 652 originates from the process control layer 620 and is proxied through the DMZ layer 630 until it reaches the BLAN layer 640 which has internet connectivity. This allows for outward communications (i.e., from the process control layer 620→cloud 652).

However, using the above approach, there is no way to initiate any requests from the cloud 652 (e.g., to send a reply from the cloud 652 to the heat trace service 624 to adjust the devices 604, 605, 606). To achieve this, the heat trace service 624 establishes an authenticated WebSocket connection when egress traffic is sent. The WebSocket connection is a persistent connection which remains open for an extended period of time. When the cloud 652 needs to communicate with the heat trace service 624, it can issue replies via the heat trace service-initiated WebSocket connection, which are handled on demand.

While the above description provides examples of one or more apparatus, methods, or systems, it will be appreciated that other apparatus, methods, or systems may be within the scope of the claims as interpreted by one of skill in the art.

The invention claimed is:

1. A method for managing and prioritizing heat trace circuit alarms, comprising:
   plotting preset alarm criticality rules and preset process criticality rules to establish a criticality matrix;
   importing from a plurality of heat trace circuits:
      an identifier tag for each heat trace circuit;
      alarm data of each heat trace circuit, including: an alarm type, an alarm time, and a current alarm status; and
      configurable settings of each heat trace circuit including: a low temperature threshold, a high temperature threshold, a low current threshold and a high current threshold;
   assigning a new criticality rating, according to the criticality matrix, for each heat trace circuit alarm if the current alarm status indicates the alarm was triggered;
   determining a self-test procedure for the alarm based on the new criticality rating;
   automatically running the self-test procedure on every heat trace circuit having the new criticality rating, wherein the self-test procedure is run independent to a controller in the heat trace circuit; and
   assessing whether the current alarm status is validated following the self-test procedure.

2. The method of claim 1, further comprising: resetting the current alarm status.

3. The method of claim 1, further comprising: processing the alarm data based on a facility maintenance procedure.

4. The method of claim 1, wherein the self-test procedure comprises energizing the heat trace circuit for a short duration to confirm current draw.

5. The method of claim 1, wherein the self-test procedure comprises a comparison of a temperature setpoint value for the heat trace circuit stored in an independent database and one of: the low temperature threshold and the high temperature threshold.

6. The method of claim 1, further comprising:
   excluding the alarm if the current alarm status indicates the heat trace circuit is forced-on or electrically locked out.

7. The method of claim 1, further comprising:
   connecting to an ERP database; and
   cross referencing the identifier tag against the ERP database to identify an existing work request for the heat trace circuit.

8. The method of claim 7, further comprising:
   submitting a new work request if the existing work request is not found, wherein the new work request includes the identifier tag, the alarm data, the configurable settings and the new criticality rating.

9. The method of claim 7, further comprising:
   comparing an existing criticality rating in the existing work request to the new criticality rating; and
   updating the existing work request, if the new criticality rating is higher priority than the existing criticality rating.

10. A system for managing and prioritizing heat trace circuit alarms, comprising:
    at least one heat trace circuit installed at a facility, each heat trace circuit comprising:
       a controller for regulating power to a heating element, wherein the controller has a plurality of configurable settings to control operation of the heat trace circuit;
       a sensor for measuring an operating parameter of the heat trace circuit to providing an input to the controller to adjust power to the heat trace circuit; and
       an alarm, wherein the alarm is triggered when the operating parameter varies from a configurable setting;
    a management device connected to the controller, the management device configured to:
       store the configurable settings, sensor data and alarm data received from the controller;
       adjust the configurable settings; and
       run a self-test procedure on each heat trace circuit, independent of the controller.

11. The system of claim 10, wherein the plurality of configurable settings comprise:
    a low temperature threshold, a high temperature threshold, a low current threshold and a high current threshold.

12. The system of claim 11, wherein the alarm is triggered when:
    current in the heat trace circuit is below the low current threshold;
    current in the heat trace circuit is above the high current threshold;
    temperature of the heating element is below the low temperature threshold;
    temperature of the heating element is above the high temperature threshold;
    the heat trace circuit is forced on;
    a connection between the controller and the management device is lost; or
    a ground fault occurs in the heat trace circuit.

13. The system of claim 10, wherein the sensor is a temperature sensor and the operating parameter is one of: ambient temperature; temperature of the heating element and temperature of the contents of a pipe in contract with the heating element.

14. The system of claim 13, wherein the self-test procedure comprises a comparison of a temperature setpoint value for the heat trace circuit stored in an independent database and one of: the low temperature threshold and the high temperature threshold.

15. The system of claim 10, wherein the sensor is a current sensor and the operating parameter is current in the heat trace circuit.

16. The system of claim 15, wherein the self-test procedure comprises energizing the heat trace circuit for a short duration to confirm current draw.

17. The system of claim 10, wherein the management device is remote to the facility and connected to the controller over a process control network.

18. The system of claim 10, further comprising an ERP system connected to the management device, wherein the ERP system stores a work request generated when the alarm is triggered.

19. The system of claim 10, further comprising a supervisory device directly connected to the controller, the supervisory device configured to:
    store the configurable settings, the sensor data and the alarm data received from the controller;

adjust the configurable settings; and
send the configurable settings, the sensor data and the alarm data to the management device over a process control network.

* * * * *